(No Model.) 3 Sheets—Sheet 1.

T. FULLEN.
SAFETY DEVICE FOR MINING CAGES OR ELEVATORS.

No. 469,346. Patented Feb. 23, 1892.

WITNESSES: INVENTOR,
Thomas Fullen,
by Snowden Bell,
Att'y.

(No Model.) 3 Sheets—Sheet 2.

T. FULLEN.
SAFETY DEVICE FOR MINING CAGES OR ELEVATORS.

No. 469,346. Patented Feb. 23, 1892.

WITNESSES:
R. H. Whittesey
F. E. Gaither

INVENTOR
Thomas Fullen
by Snowden Bell, Att'y.

(No Model.) 3 Sheets—Sheet 3.
T. FULLEN.
SAFETY DEVICE FOR MINING CAGES OR ELEVATORS.
No. 469,346. Patented Feb. 23, 1892.
FIG. 5.
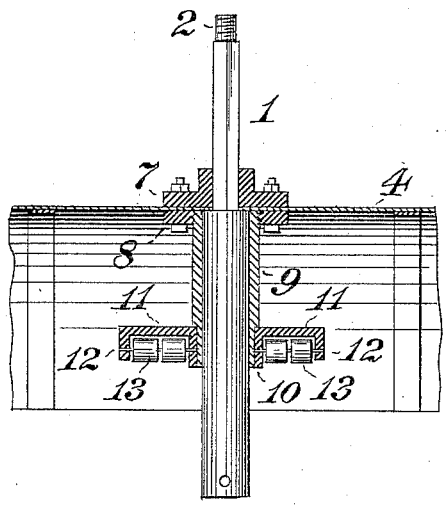
FIG. 6. FIG. 7. FIG. 8. FIG. 9.
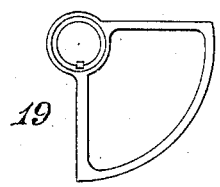 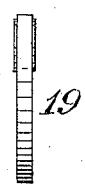 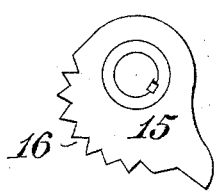 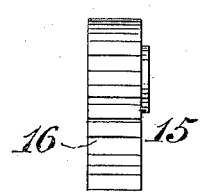
FIG. 10. FIG. 11.
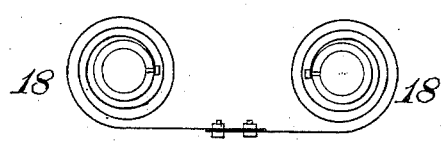 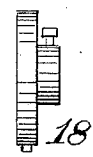
WITNESSES: INVENTOR,
N. H. Whittlesey Thomas Fullen,
F. E. Gaither. by Snowden Bell,
Att'y.
THE NORRIS PETERS CO., PHOTO-LITHO., WASHINGTON, D. C.

UNITED STATES PATENT OFFICE.

THOMAS FULLEN, OF ANGEL'S CAMP, CALIFORNIA.

SAFETY DEVICE FOR MINING CAGES OR ELEVATORS.

SPECIFICATION forming part of Letters Patent No. 469,346, dated February 23, 1892.

Application filed September 9, 1891. Serial No. 405,176. (No model.)

*To all whom it may concern:*

Be it known that I, THOMAS FULLEN, of Angel's Camp, in the county of Calaveras and State of California, have invented a certain new and useful Improvement in Safety Devices for Mining Cages, Elevators, &c., of which the following is a specification.

The object of my invention is to provide effective and reliable means for preventing loss of life and property by the running "wild" of a cage or elevator-car when control of the same is lost either by the breakage of a rope or the failure of a reel brake or clutch.

The improvement claimed is hereinafter fully set forth.

Figure 1:
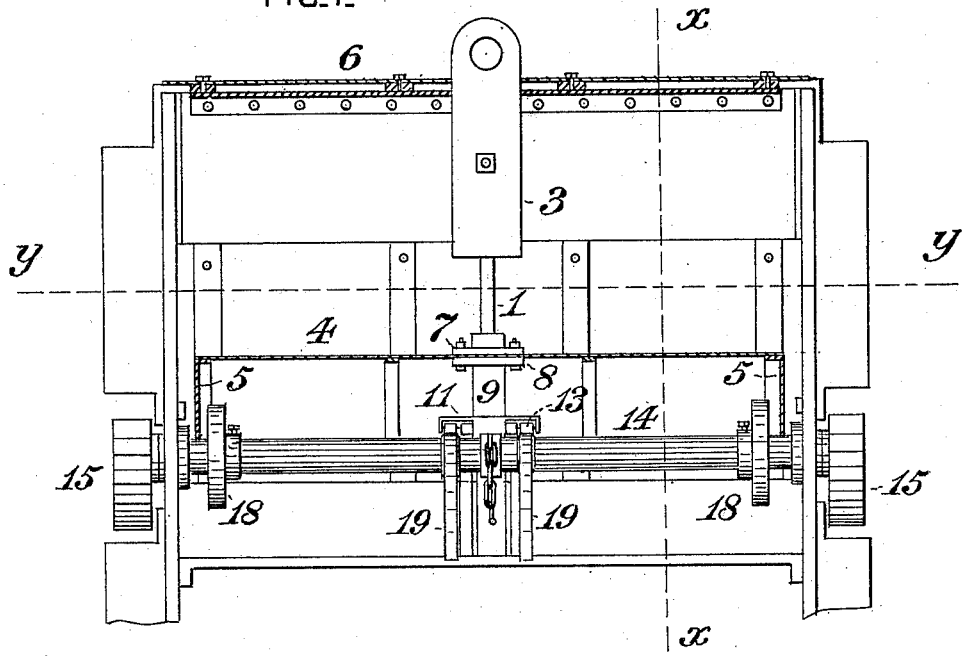
Figure 2:
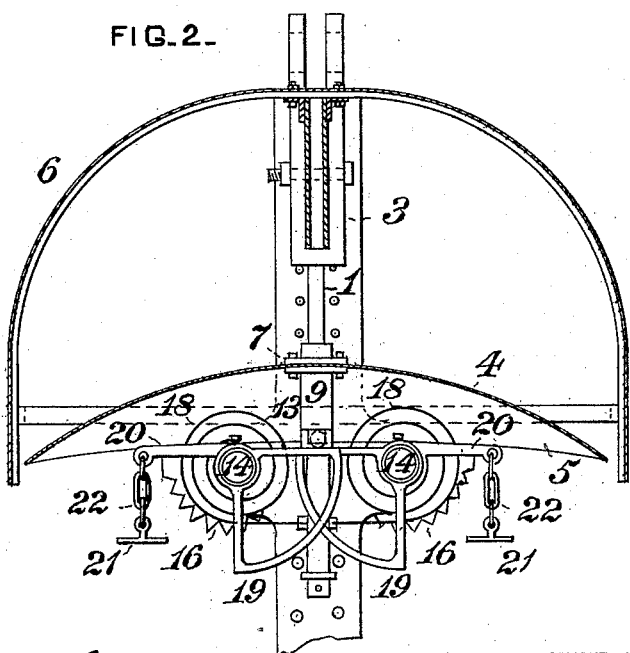
Figure 3:
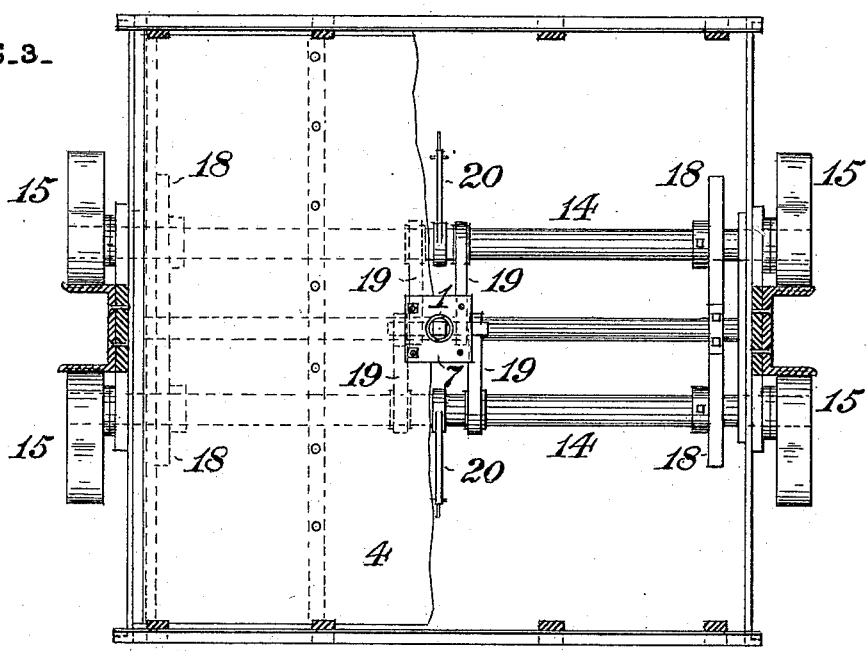
Figure 4:
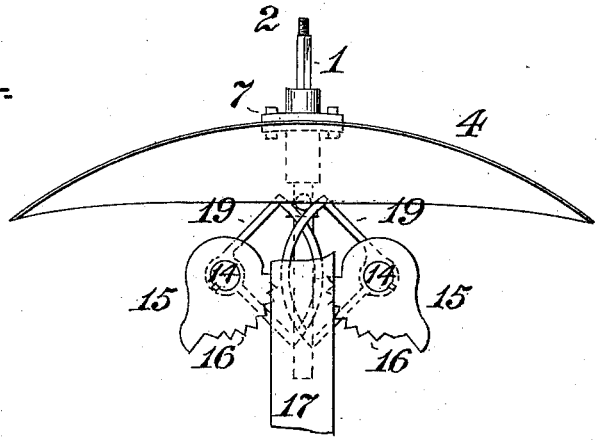

In the accompanying drawings, Figure 1 is a front view, partly in section, of the upper portion of a mining cage or skip with my improvement applied; Fig. 2, a vertical longitudinal section through the same at the line *x x* of Fig. 1; Fig. 3, a horizontal section at the line *y y* of Fig. 1 with the right-hand half of the parachute removed; Fig. 4, a side view of the parachute, quadrants, and eccentric locking-dogs, showing the parts in the positions occupied when the safety device has been brought into action to avoid an accident; Fig. 5, a vertical section, on an enlarged scale, through the vertical stem of the parachute and its connections; Fig. 6, a side view, and Fig. 7 an end view, of one of the quadrants; Fig. 8, a side view, and Fig. 9 an end view, of one of the eccentric locking-dogs; Fig. 10, a section through two of the connected coiled springs, and Fig. 11 an end view of the same.

In the practice of my invention I provide and connect to the frame of a mining-cage or elevator-car a safety device of the following construction: A vertical guide-stem 1, which is preferably formed of brass in order that it may not be subject to deterioration by rusting, is secured firmly at its upper end, as by a screw-thread 2, to the upper portion of the frame 3 of a mining cage or skip or of an elevator-car, the axial line of the guide-stem being coincident or substantially coincident with the intersection of the vertical transverse and longitudinal central planes of the cage. The upper portion of the stem 1 is square or provided with squared or flattened sides, and the lower portion, being that having the larger diameter, as shown in Fig. 5, is cylindrical. The object of squaring the upper portions of the stem is to prevent twisting and insure ease and certainty of motion of the members, presently to be described, which slide thereon; but it will be obvious that such form is not essential and that the same object may, if preferred, be attained by the employment of a stem which is cylindrical throughout its length and is provided with a longitudinal key or feather fitting slots or recesses cut in the flanges which slide on the stem.

A thin plate of steel or wrought-iron 4 is bent into the form of an arc of a circle and provided with segmental end plates 5 to form a resistance-plate or what I term, descriptively, a "parachute," from its analogy in function to the device ordinarily so known. The parachute, which is made of as great length and width as is compatible with the capability of moving freely vertically within the bonnet 6 of the cage, is stiffened by internal plates or angle-irons and is fitted to slide with its concave side downward on the squared portion of the stem 1, upon which it is guided by a flange 7, bolted to its top above a central opening therein and fitting truly on the squared portion of the stem. A lower flange 8 is secured to the inside of the top plate of the parachute concentric with the flange 7, said lower flange being centrally threaded or otherwise adapted to be secured to the upper end of a long sleeve or guiding-support 9, which is bored out to fit truly on the cylindrical portion of the stem and is, like the stem and for the same reason, preferably of brass. A collar 10 is secured to the lower end of the sleeve 9, said collar having two horizontal arms 11 projecting laterally from its top in or about in line with the central transverse plane of the cage. The arms 11 are turned downwardly at their outer ends and serve to support the outer ends of two pins or fixed axles 12, the inner ends of which are fixed in the collar 10 and the portion of the sleeve 9 within the same. The pins 12 are consequently rigidly connected with the parachute through the sleeve 9 and flange 8, and each pin carries two rollers 13, which are fitted to rotate freely upon it and which constitute abutments through which pressure due to the weight of the parachute and its connections is transmitted to the shafts carrying the locking-dogs.

Two horizontal shafts 14 are journaled on the frame of the cage a short distance below the normal position of the rollers 13, said shafts extending transversely on the cage and being set at equal distances from the center line of the stem. An eccentric locking-dog 15, having a series of peripheral teeth 16, is secured upon each end of each of the shafts 14, the teeth of said dogs being located adjacent to the sides of the wooden guides 17, which line the elevator-shaft, and being adapted to engage the same in and by the rotation of the shafts 14 in the direction indicated by the arrows. Two helical or coil springs 18 are keyed to each of the shafts 14, the springs of one shaft being opposite those of the other and the opposite springs being connected at their ends one to the other. The tension of said springs acts when unopposed by a weight or force greater in degree to rotate the shafts 14 in the direction of the arrows and bring the teeth of the locking-dogs 15 into contact with the fixed wooden guides 17.

Two quadrants 19 are keyed upon each of the shafts 14 and project therefrom in the direction of the guide-stem 1. Each of said quadrants is located directly below one of the rollers 13, said rollers abutting against and exerting downward pressure upon the upper flat face of the quadrants, the tendency of such pressure being to rotate the shafts 14 in direction opposite to that indicated by the arrows, and consequently to prevent engagement of the teeth of the locking-dogs with the fixed wooden guides.

A hand-lever 20 is keyed to each of the shafts 14 near its center, the outer ends of said levers being provided with hand-grips 21, connected to the levers by links 22. The object of such construction is to enable the occupants of the cage by a downward pull on the hand-levers to rotate the shafts 14 and engage the teeth of the locking-dogs with the fixed wooden guides when it is desired to stop the cage in case of negligence on the part of the engineer—as, for example, lowering the cage past the last level in a mine to the water.

It will be seen from the foregoing description that the parachute and the parts connected thereto are adapted to slide freely upon the vertical guide-stem and that the squared portion of the stem and the corresponding opening in the upper flange of the parachute prevent any twisting of the latter and insure the parallelism of the axes of the rollers with those of the horizontal shafts carrying the locking-dogs and quadrants, and consequently of the faces of the rollers with those of the quadrants. The object of employing a long sleeve or guiding-support is to provide such ample bearing-surface as will effectually prevent cramping.

In operation, under normal conditions, the rollers, the axles of which are fixed to the parachute, bear upon the upper flat faces of the quadrants, and the weight of the parachute and its connections, acting on the inner ends of the quadrants, balances the tendency of the springs to uncoil and holds the teeth of the locking-dogs clear of the fixed wooden guides, thereby permitting the cage to be freely raised and lowered. The weight acting on the quadrants may be adjusted, as desired, to maintain the parts in such normal positions for different speeds of the cage. In the event of a sudden downward motion of the cage or of a quicker downward motion than that for which the weight and springs are adjusted the resistance opposed to the parachute by the air below it relieves the quadrants from the downward pressure exerted upon them through the rollers, and the springs thereupon uncoil and rotate the horizontal shafts and locking-dogs, bringing the teeth of the latter in contact with the fixed wooden guides. The teeth are drawn into firm engagement with the guides by the downward motion of the cage, and the latter is thereby stopped and held until released by upward draft. The rollers are then held in position between the curved faces of the quadrants, as indicated in Fig. 4. When the cage is drawn upward, the horizontal shafts and locking-dogs rotate until the teeth of the locking-dogs are clear of the fixed wooden guides and the quadrants resume their normal positions, the rollers again bearing upon the horizontal flat faces of the quadrants and counteracting by the weight applied thereto the uncoiling tendency of the springs. The safety device thus automatically adjusts itself in readiness for renewed action.

I am aware that a pair of air-wings, each attached to a pivot-shaft carrying dogs on its ends, said shafts being coupled one to another by springs, has been heretofore known in a safety-clutch mechanism for elevators. Such construction, which differs substantially from my invention, I therefore distinctly disclaim, and I also disclaim, broadly, the employment of a fluid-pressure resistance-plate as a means of effecting the engagement of latch-levers or locking-dogs with fixed ratchets.

I claim as my invention and desire to secure by Letters Patent—

1. The combination of a hoisting-cage, a vertical guide-stem fixed centrally thereto, a parachute fitted to slide on said guide-stem, and spring-actuated locking mechanism mounted on the cage and controlled by the vertical movement of the parachute upon the guide-stem, substantially as set forth.

2. The combination, in a safety device for hoisting-cages, of a guide-stem adapted to be fixed to a hoisting-cage frame, a resistance-plate or parachute fitted to slide vertically on said stem, abutments connected to and movable with said resistance-plate, shafts adapted to rotate on a hoisting-cage frame and carrying quadrants bearing against said abutments, toothed locking-dogs fixed eccentrically upon said shafts, and springs connected to and exerting tension upon said shafts in direction opposite to that of the pressure of the abutments on the quadrants, substantially as set forth.

3. The combination, in a safety device for hoisting-cages, of a guide-stem adapted to be fixed to a hoisting-cage frame, a resistance-plate or parachute fitted to slide vertically on said stem, abutments connected to and movable with said resistance-plate, shafts adapted to rotate on a hoisting-cage frame and carrying quadrants bearing against said abutments, toothed locking-dogs fixed eccentrically upon said shafts, springs connected to and exerting tension upon said shafts in direction opposite to that of the pressure of the abutments on the quadrants, and hand-levers fixed to and projecting from said shafts in direction for the application of power in co-operation with the tension of the springs, substantially as set forth.

4. The combination, in a safety device for hoisting-cages, of a guide-stem adapted to be fixed to a hoisting-cage frame, a resistance-plate or parachute fitted to slide vertically on said stem and guided by squared faces thereon, a sleeve fixed to the resistance-plate and fitting around the guide-stem, rollers journaled on axles fixed to said sleeve, shafts adapted to rotate on a hoisting-cage frame and carrying quadrants bearing against said rollers, toothed locking-dogs fixed eccentrically upon said shafts, and springs connected to and exerting tension upon said shafts in direction opposite to that of the pressure of the rollers on the quadrants, substantially as set forth.

5. The combination, in a safety device for hoisting-cages, of eccentric locking-dogs having toothed faces, springs connected to said dogs and acting to rotate the same in one direction, and a resistance-plate or parachute adapted to transmit pressure to said dogs in direction opposite to that due to the tension of the springs, substantially as set forth.

THOMAS FULLEN.

Witnesses:
WARREN ROSE,
ALEXANDER LOVE.